Oct. 18, 1932.   R. W. SEARS, 2D., ET AL   1,883,414
AIR VEHICLE
Filed May 31, 1928   4 Sheets-Sheet 1
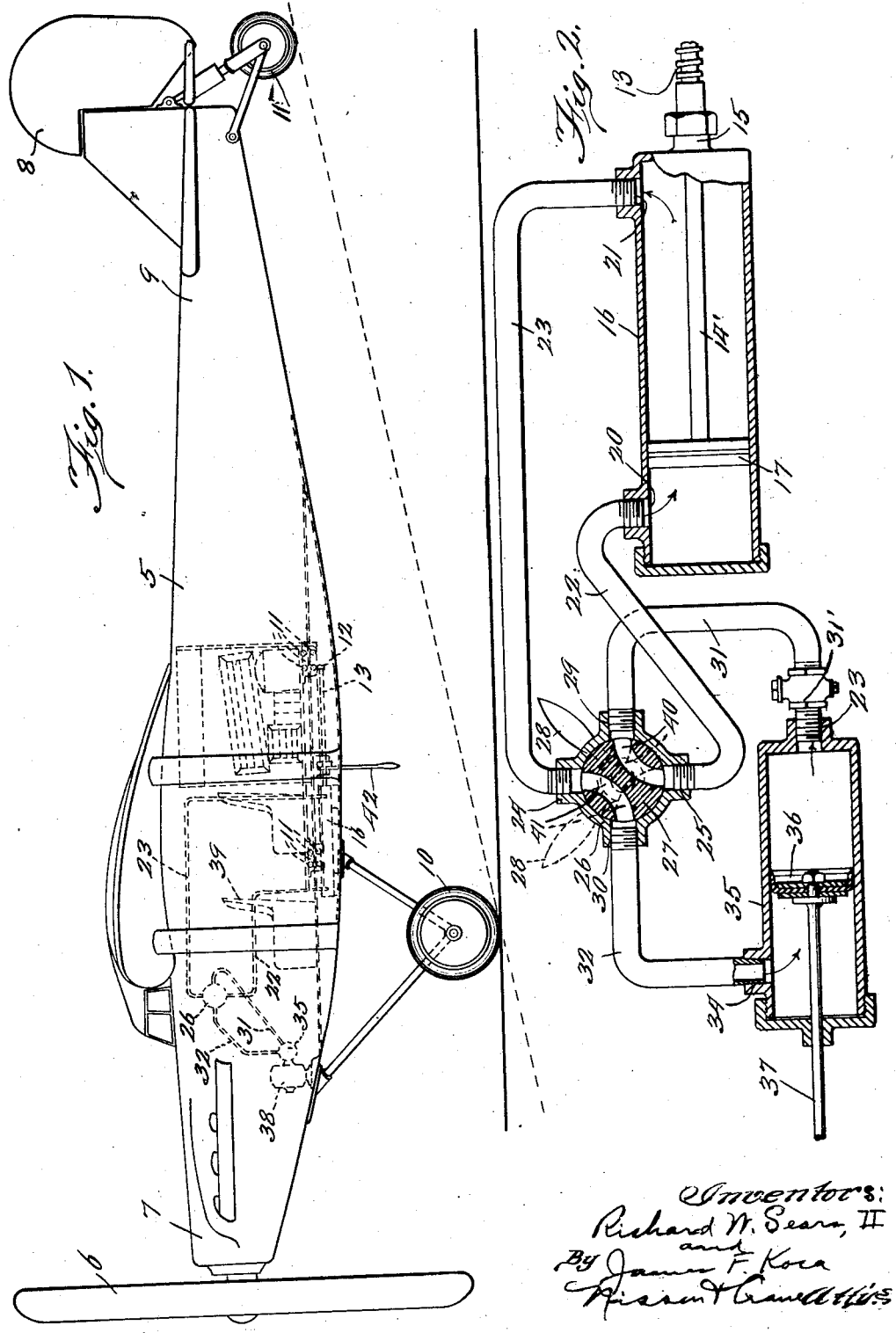

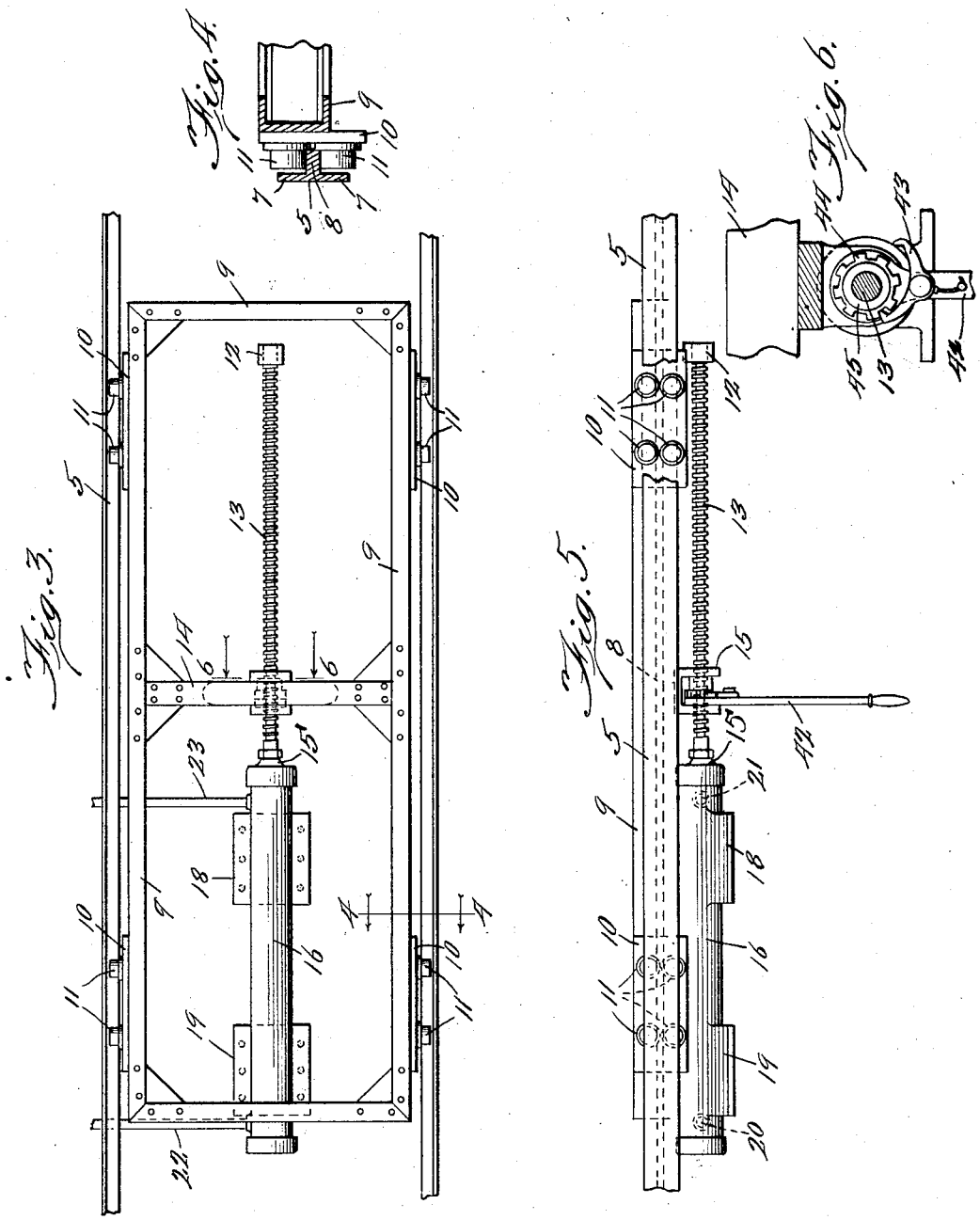

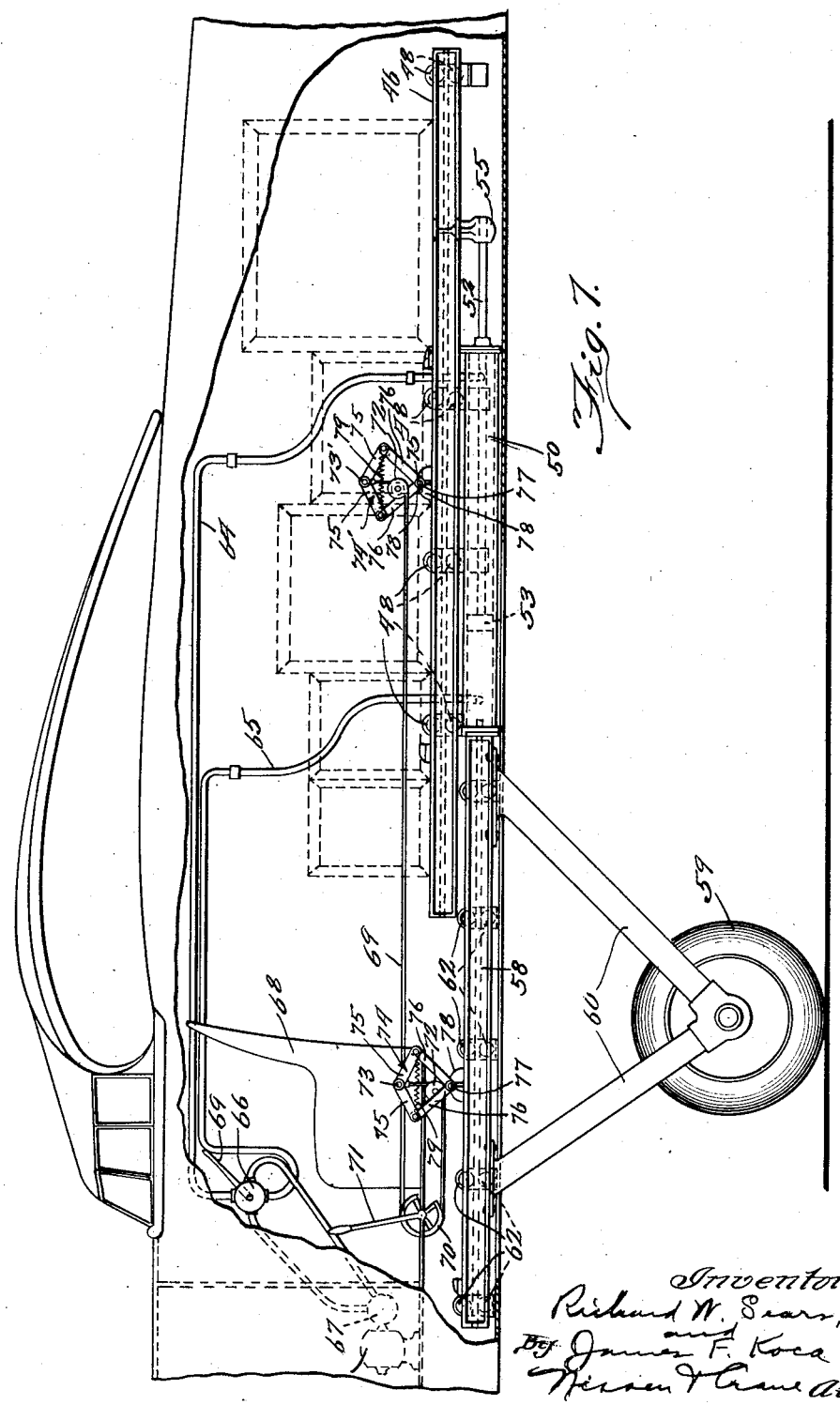

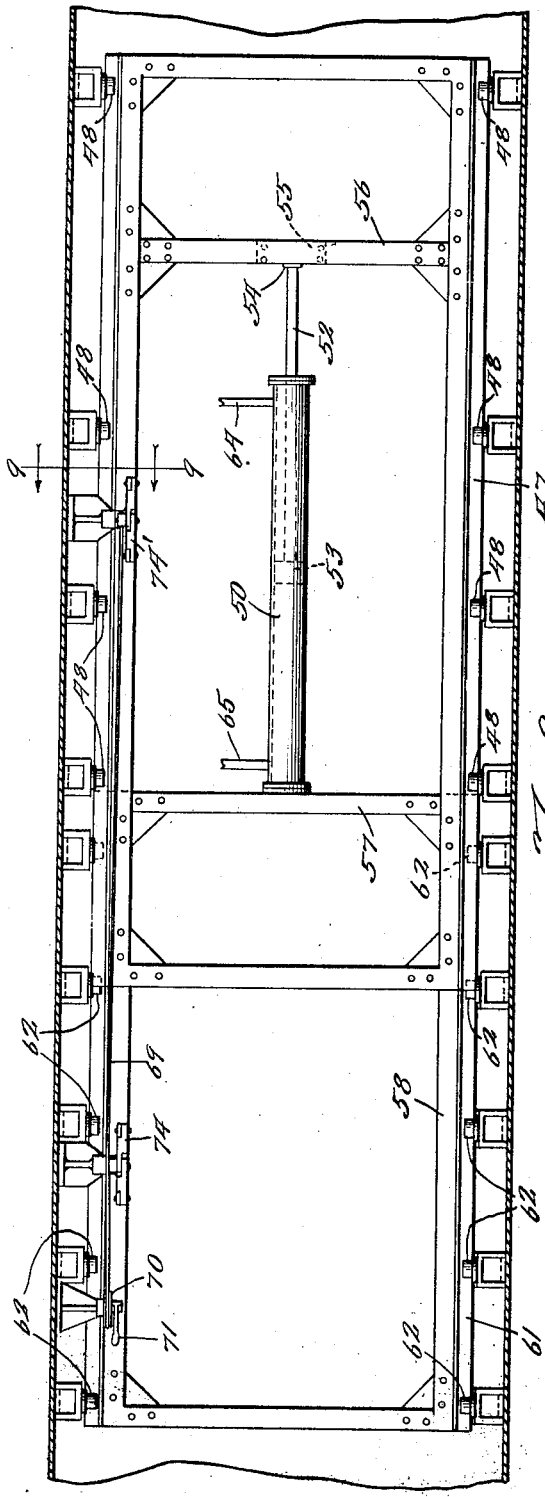
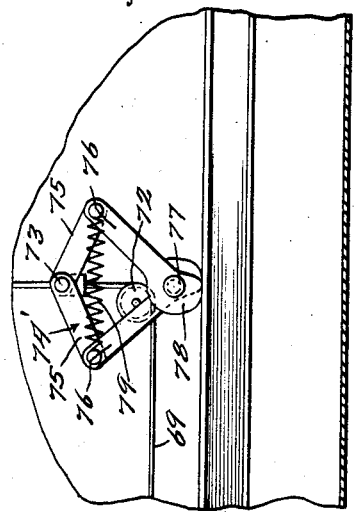
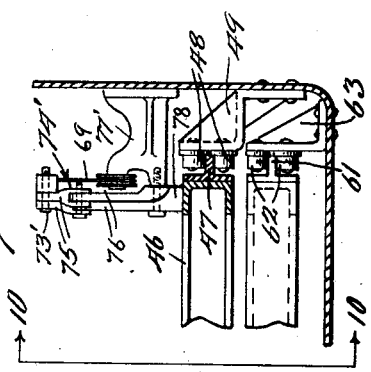

Patented Oct. 18, 1932

1,883,414

UNITED STATES PATENT OFFICE

RICHARD W. SEARS, 2D, AND JAMES F. KOCA, OF WOODSTOCK, ILLINOIS; SAID KOCA ASSIGNOR TO SAID SEARS, 2D

AIR VEHICLE

Application filed May 31, 1928. Serial No. 281,656.

Our invention relates in general to air vehicles and has particular reference to means for balancing the vehicle on the take-off, when in flight, or in landing.

The primary object of the invention is to provide means for changing the position of the center of gravity of the vehicle longitudinally in relation to either the center of pressure or the landing gear or both by shifting the weight of a part of the vehicle itself or the weight carried by the vehicle, which may be the weight of the passengers carried thereby, or the weight of the cargo, or the weight of the fuel, or any other such load, or even weights other than the loads mentioned.

Another object of the invention is to provide means for also shifting the landing gear with respect to the center of gravity of the vehicle so as to facilitate landing and take-off and also to facilitate taxiing the vehicle across the ground or other such surface.

Still another object of the invention is to provide means for mechanically shifting the center of gravity of the vehicle while the vehicle is in flight and with the instrumentalities employed for effecting this shifting conveniently operated by the operator.

Still another object of the invention is to provide means for shifting the center of gravity of the vehicle while the same is on the ground surface by manually operated means other than that which is employed for the same purpose when the vehicle is in flight.

Other objects of the invention will appear hereinafter, the novel features and combinations being set forth in the appended claims.

In the accompanying drawings, which have been selected for the purpose of illustrating the salient features of the invention,—

Fig. 1 is a view in side elevation of an air vehicle illustrating the application of our invention;

Fig. 2 is a detail view in plan, and partly in section, of the fluid-pressure distributing apparatus which is employed in connection with the invention, and which forms a part thereof;

Fig. 3 is a detail view in plan of the load platform and the track therefor with which the air vehicle is equipped in accordance with our invention;

Fig. 4 is a detail view in section taken on the line 4—4 of Fig. 3, showing the manner of mounting the load platform on the track;

Fig. 5 is a detail view in side elevation, showing the co-operative relationship between the load platform, the track and the means for shifting the load platform longitudinally along the track in response to fluid pressure;

Fig. 6 is a detail view in end elevation, showing the means for manually shifting the load platform along the track independently of the fluid-pressure means;

Fig. 7 is a view in side elevation of an air vehicle with sides of the fuselage broken away, illustrating the application of a modified form of the invention;

Fig. 8 is a view in plan of that form of the invention illustrated in Fig. 7;

Fig. 9 is a view in cross section taken on the line 9—9 of Fig. 8; and

Fig. 10 is a detail view in side elevation, looking in the direction of the arrows 10—10, Fig. 9.

Referring now to the drawings in detail, particularly Fig. 1, 5 represents the fuselage or body of a conventional type of air vehicle having a propeller 6 of the tractor type at the nose end 7 of the vehicle, and with the customary rudder 8 at the tail end 9. As is customary with most air vehicles of the type illustrated, the landing gear comprises the ground wheels 10 and the trailing wheel 11', the same being suspended from about the center and tail of the vehicle, respectively, in any manner suitable for the purpose.

Without going too far into a detailed description of the difficulties encountered with the aeroplane when in flight, including take-off and landing, it should be at least explained that both passenger and freight carrying air vehicles, while heretofore having been provided with load-carrying space, have never had any provision whereby the cargo or the passengers may be shifted longitudinally of the vehicle so as to change the center of gravity of the vehicle to compensate for and prevent the tendency of the vehicle to tip forward or rearward as the result of an improperly balanced load.

As an example, an air vehicle may take off with its fuel tanks loaded to capacity. Some of the fuel tanks may be located in front or in advance of the center of gravity, and when the fuel has been consumed from these tanks, the center of gravity has been shifted so that when multiplied by the weight of the cargo or passengers the plane becomes unbalanced, making it not only difficult to handle, but increasing the likelihood of a nose dive or a tail spin, depending upon the position of the weight.

Furthermore, without the possibilities to be encountered, by the weight of the fuel, it may so happen, and, in fact, it has happened, that the weight of the cargo or passengers has been improperly located so that the plane takes off in an unbalanced condition, and this hazard may or may not be increased as the result of fuel consumption and the decreasing weight of the same.

In any event, the purpose of our present invention is to compensate for the weight carried so as to prevent the possibilities of accident and difficult handling of the machine in flight, as well as at the take-off and landing.

We may accomplish this object in various ways, all of which are concerned with longitudinal shifting of the load, as this appears to be the most convenient and practical method of reducing the theory of the invention to practice.

So far as concerns the illustrative embodiment of the invention selected for illustration in the accompanying drawings, and referring particularly to Fig. 3, 5 and 6 represent a pair of parallel track or rail members which are of a length suitable for the purpose, and the same are mounted in the fuselage of the vehicle at a location where passengers, cargo, or other loads are to be carried. These track members may be conveniently made from T-shaped angle-iron, shown to best advantage in cross-section in Fig. 4, the same having a vertical outer flange 7 with an intermediate laterally-projecting tread surface 8. The rails may be anchored in the fuselage in any convenient manner.

Positioned intermediate the rails or track members is a frame structure 9 for a load-carrying platform. This frame structure is preferably equipped with two sets of wheels or rollers 10, including upper and lower spaced rollers, wheels or the like 11, which are adapted to engage the upper and lower tread surfaces of the laterally-projecting flange 8 of the rails. In this way, the load platform may be anchored against vertical movement and at the same time mounted free for longitudinal movement along the track. The rollers 11 may be provided with anti-friction bearings or otherwise constructed to run freely on the track.

Mounted below the frame 9 of the load platform, with one end carrying a head, or the like 12, is a relatively long screw 13, the same being disposed intermediate the side members of the frame 9 and extending longitudinally beneath the frame from adjacent one end thereof to substantially half way of the length of the frame. Depending below the intermediate bracing member 14 of the frame 9 is a bifurcated or yoke structure 15 which has registering openings in its parallel sides, through which the screw 13 extends. The opposite end of the screw 13 terminates in a piston rod 14' (see Fig. 2), which extends through a packing gland or stuffing box 15 in a cylinder 16.

Mounted within the cylinder 16 on the end of the piston rod 14 is a piston 17 which is mounted to slide within the cylinder 16 in response to thrust from opposite sides as the result of the introduction of fluid-pressure into the cylinder 16 from opposite sides of the piston 17. The cylinder, as best illustrated in Figs. 3 and 5, is mounted upon the floor of the fuselage independently of the platform frame, by means of the plate brackets 18 and 19, and the same extends longitudinally of the load platform. In this way, the platform is movable separately of the cylinder and other parts of the fluid pressure system.

Disposed adjacent opposite ends of the cylinder 16 are a pair of fluid-pressure openings 20 and 21, to which are connected distributing pipes 22 and 23, respectively. These pipes lead into communication with the ports 24 and 25 of a four-way valve structure 26, the same having a rotatable core 27 which may be controlled by a handle 28 intended to be manipulated by the pilot or some one else in control. The other two-way ports for this valve 26 are illustrated at 29 and 30. These ports 29 and 30 are disposed between the ports 24 and 25 so that each pair of ports is positioned at diametrically opposite sides of the valve. Connected to the ports 29 and 30 are distributing pipes 31 and 32, respectively. These pipes 31 and 32 communicate through the ports 33 and 34 with opposite ends of a cylinder 35, in which the piston 36 is mounted with freedom of reciprocation, the ports 33 and 34 being positioned at opposite sides of the piston, the reason for which will be hereinafter explained. The piston 36 is equipped with a piston rod 37 which extends through the end of the cylinder 35, the same being connected in any suitable manner so that it may be reciprocated as the result of the operation of an electric motor 38, shown in Fig. 1.

In operation, and assuming that the flight of the vehicle develops an unbalanced position of the load for any reason whatsoever, the operator occupying the pilot's seat 39 may start the motor 38, then reach up, grasp the handle 28 of the valve structure 26, and throw the same to rotate the core 27 into a position which will establish communication on one side or the other of the piston 17, depending upon whether the load should be moved forward or backward, and as the result, if the fluid pressure is transferred from the cylinder 35 into the cylinder 16 in advance of the piston 17, it will impart a rearward thrust to the piston rod 14', to the screw 13, and since the screw is threaded through the collar 45, it will slide the platform rearwardly, carrying with it the load, whether the load happens to be passengers or freight. The pilot's seat will not be located on the load platform, so that it will not be shifted with the load; the extra seat shown by dotted lines in Fig. 1 is for passengers. By reversing the valve 26, the operator introduces fluid pressure in back of the piston 17 so as to move the same forward in the cylinder 16, imparting a pull to the piston rod 14', and likewise a pull to the load platform so that the same will slide forward. It, of course, should be understood that the core 27 of the valve structure is made with ports 40 and 41, which are shiftable to establish communication between each of the two pairs of distributing pipes so as to provide for the control of the fluid pressure to opposite sides of the piston 17.

Just prior to a take-off, as an example, after the vehicle has been loaded and is ready for flight, it may happen that it will be noticeable that the load is not properly distributed, in which event, instead of moving and shifting the platform by means of fluid pressure, it may be manually shifted by a ratchet lever 42 which is pivotally suspended below the fuselage of the vehicle in a position where it may be grasped by any one standing on the ground. This lever is made with a double pawl 43 which is adapted to engage the teeth 44 on a collar 45 surrounding the screw 13, with the internal diameter of the collar threaded to correspond to the threads on the screw. In this way, by rocking the lever 42 back and forth, the collar 45 will be rotated, which in turn will impart a pull on the screw 13, moving the platform either forwardly or rearwardly, depending, of course, on which one of the double pawls 43 is moved into engagement with the teeth 44 of the collar. The collar may be suitably fixed against longitudinal movement between the bifurcations of the depending yoke-like member 15.

The fluid pressure system, best illustrated in Fig. 2, functions as follows, by way of an example of one instrumentality that may be used for shifting the platform. With the valve 26 in position as shown, a forward thrust on the piston rod 37 will force the fluid out of the port 23 through the pipe 31, through the valve port 40, into the pipe 22 in front of the piston 17, which will move the piston 17 rearwardly and thus impart a thrust to the rod 14' and screw 13.

When the screw moves the platform rearwardly of the fuselage, the load will be shifted accordingly. The fluid in back of the piston 17 will, upon this operation, be displaced through the port 21 into the pipe 23 and into the cylinder 35 in back of the piston 36 through the valve port 41 and the pipe 32. To reverse the platform, that is to say, move it forward, the valve 26 will be changed to register the port 40 in the valve with the pipe connected ports 29 and 24. Therefore, when the piston 36 is moved forward, the fluid will be forced through the pipe 31 into the pipe 23 and introduced into the cylinder 16 in back of the piston 17. This will move the piston 17 forward and shift the platform forward.

When the piston 36 is moving backward, the pipe 31 will be blocked by a check valve 31' and fluid in back of the piston 36 will move into the space in front thereof past the cup washer of the piston. This diagrammatic illustration will be sufficient to indicate how the platform may be shifted by means other than manual power.

In the modified form of the invention illustrated in Figs. 7 to 10, inclusive, we have provided means for not only shifting the load platform but also for shifting the landing gear. In this way, the position of the landing gear may be adjusted relative to the center of gravity so as to facilitate take-off and landing.

In this modified form, 46 represents the load platform frame which is equipped with tracks 47 along its opposite sides, the track being similar to the tracks 5 in the first described form and adapted to run between rollers or wheels 48 which are supported from brackets 49 secured to the inside of the fuselage. In this form, as in the other form, a cylinder 50 is provided and this cylinder is equipped with a piston rod 52 for the piston of the cylinder, the piston being shown in dotted lines as at 53 in Fig. 7. The end of the piston rod is anchored, as at 54, to a bracket 55, suspended from a cross brace 56 of the platform frame. The opposite end of the cylinder 50 is secured to the end brace 57 of the lower frame structure 58 from which the ground wheels 59 are suspended by the hangars 60. This lower frame structure 58 is also mounted to slide longitudinally and the same is provided, as best shown in Fig. 9, with tracks 61 along its opposite sides which are extended to slide between rollers 62 which are mounted to the brackets 63. Fluid pressure is supplied to the cylinder 50 on opposite sides of the piston mounted therein by means of conduit pipes 64 and 65 a length of which are flexible and enter the sides of the cylinder adjacent the ends thereof in a similar manner as explained with reference to the conduits 22 and 23 in Fig. 2, which illustrates the other form of the invention. The pipes 64 and 65 communicate through a four-way valve 66 to a cylinder and piston structure 67, substantially the same as the cylinder 35 and the piston 36 in Fig. 2, so that the pilot occupying the seat 68 may manipulate the handle 69 of the valve 66 for moving the piston 53 in reverse directions in the cylinder 50 and thereby shifting the platform 46 for moving the load longitudinally of the vehicle.

With the piston rod 52 secured to the cross brace 56 of the platform 46 and the end of the cylinder secured to the cross brace 57 of the platform 58, when the valve 66 is manipulated to introduce fluid pressure through the conduit 64 in back of the piston 53, the forward movement of the piston 53, in response to the fluid pressure behind it, will move the platform 46 forward. A locking device is provided for both of the platforms 46 and 58 so that one may be moved independently of the other. This locking device will be hereinafter more particularly referred to.

When the valve 66 is manipulated to introduce fluid pressure in front of the piston 53 through the conduit 65, the piston 53 will be moved rearwardly, which will slide the platform 46 rearwardly when the platform 46 is to be moved either forwardly or rearwardly, the platform 58 is locked against movement.

To shift the position of the platform 58 rearwardly, the platform 46 is locked against movement so that when the valve 66 is manipulated to introduce fluid pressure through the conduit 64 behind the piston 53, the platform 58 will be moved rearwarlly. The cylinder in this connection moving and the piston 53 remaining stationary due to its connection with the frame 46, which, as stated, is locked against movement. When it is desired to move the platform 58 forwardly, the valve 66 is manipulated to introduce fluid pressure through the conduit 65 in front of the piston 53 and the cylinder will therefore be moved forwardly with the piston 53 remaining stationary.

When it is desired to move the platform 46, the platform 58 is locked against movement. The conduits 64 and 65 for a suitable portion of their length are flexible so that they may move with the cylinder 50. From the above, it will be seen that both the platforms 46 and 58 may be moved independently of one another by the same operating mechanism and their movement controlled by a single valve.

The locking mechanism for these platforms preferably comprises a cable 69 which is fastened to a wheel 70 which is operated by a handle 71 adjacent the pilot's seat 68. The cable, after passing around the wheel 70, extends in one direction to the locking device of the platform 58 and in an opposite direction to the locking device for the platform 46. Both of these locking devices are constructed the same and only one will therefore be specifically described. To distinguish one from the other, however, the locking device for the platform 58 is shown as at 74 in Fig. 7 and the locking device for the platform 46 is shown as at 74' in Fig. 7. Each embodies in its construction a pulley 72 around which the cable extends with the end of the cable secured to the pivoted joint 73 connecting the ends of a pair of links 75, the opposite ends of which are pivotally connected to a set of levers 76, the ends of which terminate in locking blocks or cams 78. The levers 76 are pivotally mounted on the bracket 77' which is mounted rigidly to the fuselage.

A spring 79 for each of the locking devices holds the blocks or cams 78 normally in locking engagement with the platforms so that both the platforms are normally locked against movement. When the pilot moves the lever 71 forward, as an example, and imparts a pull to the longer length of the cable 69, it will overcome the influence of the spring 79 on the locking device for the platform 76 and release the blocks or cams 78 so that the platform 46 is free to move in response to the fluid pressure mechanism. By moving the lever 71 rearwardly, the tension on the long length of the cable 69 will be relieved which will permit the locking device 74' to lock the platform 46 in position and at the same time release the platform 58 by the pull on the short length of the cable, overcoming the spring 79 on the locking device 74. When the lever 71 is moved into neutral position, the locking devices take command of their respective platforms and hold the same against movement.

Obviously, those skilled in the art may make various changes in the construction and arrangement of parts without departing from the spirit and scope of the invention as defined by the claims hereto appended, and we therefore do not wish to be restricted to the precise construction contained herein.

We claim:—

1. An air vehicle having a load supporting mechanism mounted on the vehicle and reversibly shiftable into predetermined positions, and manually controlled fluid pressure means for shifting said load supporting mechanism, and means for shifting the position of the vehicle landing gear relatively of the position of the load supporting mechanism.

2. An air vehicle having a load supporting mechanism mounted on the vehicle and reversibly shiftable into predetermined positions, fluid pressure means for shifting said mechanism, and manually actuated means for also shifting said mechanism relatively to the connection between said fluid pressure means and said carriage.

3. In an air vehicle, the combination of means for mechanically shifting the center of gravity of the vehicle by adjusting the position of the load carried by the vehicle comprising a load supporting platform, a track for said platform, and means for moving the platform along said track comprising a fluid pressure responsive apparatus, a control valve for reversing the operation of said apparatus, and a manually actuated mechanism operable independently of said fluid pressure responsive apparatus for shifting said platform relative to the fluid pressure responsive means.

4. In an air vehicle, the combination of a load supporting moving mechanism, and means for operating said mechanism to move the load supported thereby progressively into predetermined positions and in opposite directions longitudinally of the vehicle for shifting the center of gravity of the vehicle, said mechanism comprising a fluid pressure responsive apparatus including a piston and an operative connection between said piston and said mechanism and means to vary the relative positions of said piston and said load support.

5. In an air vehicle, the combination of a load supporting and moving mechanism, and means for operating said mechanism to move the load supported thereby progressively into predetermined positions and in opposite directions longitudinally of the vehicle for shifting the center of gravity of the vehicle, said mechanism comprising a fluid pressure responsive apparatus including a piston and an operative connection between said piston and said mechanism, and manually actuated means for also moving said load supporting and moving mechanism in a corresponding manner but independently of said fluid pressure responsive apparatus.

6. In an air vehicle, the combination of a load supporting and moving platform, landing gear, and means for selectively adjusting the relative positions of said load supporting and moving platform and said landing gear longitudinally of the vehicle.

7. In an air vehicle, the combination of a load supporting and moving platform, landing gear, means for selectively adjusting the relative positions of said load supporting and moving platform and said landing gear longitudinally of the vehicle comprising fluid pressure mechanism, and a releasable holding means for said platform and said landing gear for holding one while the other is moved.

8. In an air vehicle, the combination of a load supporting and moving mechanism comprising a platform, a roller or the like equipped frame structure for said platform, a track disposed longitudinally of the vehicle upon which said frame structure is movable, and means for moving said frame structure back and forth on said track comprising a longitudinally movable actuating screw connected to said frame and manually operable means for moving said screw in opposite directions.

9. In an air vehicle, a load supporting device, landing gear, and means common to said device and landing gear for selectively shifting the positions thereof relatively of the vehicle.

10. In an air vehicle, a load supporting device, landing gear, means common to said device and landing gear for selectively shifting the positions theerof relative of the vehicle, and means for selectively and collectively locking said device and landing gear against movement.

11. In an air vehicle, the combination with a load supporting platform, a screw-threaded rod connected thereto, a nut threaded on said rod and held against bodily movement relative to said platform, means for actuating said nut to move said rod longitudinally and to thereby move said platform, a cylinder, and a piston on said rod adapted to operate within said cylinder to move said platform independently of said nut when pressure is exerted on said piston.

12. A device as claimed in claim 11 in which the nut is provided with means for rotating it in a plurality of directions.

13. In an air vehicle, the combination with an adjustable load platform, of guides for said load platform, an adjustable landing gear, guides for said landing gear, and means for selectively holding said platform and landing gear in adjusted position relative to each other or to said air vehicle.

14. In an air vehicle, the combination with an adjustable load platform, of guides for said load platform, an adjustable landing gear, guides for said landing gear, and brake mechanism for selectively holding said platform and landing gear in adjusted position relative to each other or to said air vehicle.

15. In an air vehicle, the combination with an adjustable load platform, of guides for said load platform, an adjustable landing gear, guides for said landing gear, and friction braking means for selectively holding said platform and landing gear in adjusted position relative to each other or to said air vehicle.

16. In an air vehicle, the combination with a load carrying means mounted to be moved relative to the fuselage of said air vehicle, of a landing gear carrying means moving relatively to the fuselage of said air vehicle, a piston rod and piston attached to one of said carrying means, a cylinder attached to the other of said carrying means and in which said piston is adapted to reciprocate, and means for actuating said piston to move said load carrying means relatively to said landing gear carrying means.

17. In an air vehicle, the combination with a load carrying means mounted to be moved relative to the fuselage of said air vehicle, of a landing gear carrying means moving relatively to the fuselage of said air vehicle, a piston rod attached to one of said carrying means, a cylinder attached to said other carrying means and in which said piston is adapted to reciprocate, means for moving said piston and cylinder relatively to each other to move said load carrying means relatively to said landing gear carrying means, and means for selectively holding each of said carrying means in adjusted position relative to each other and to the fuselage.

18. In an air vehicle, the combination with an adjustable load platform, of guides for said load platform, and adjustable landing gear, guides for said landing gear, releasable means for holding said platform and landing gear in adjusted positions, and a single means for selectively adjusting the positions of said landing gear and platform relative to said air vehicle and to each other when said releasable means is released.

19. In an air vehicle, the combination with an adjustable load platform, of guides for said load platform, an adjustable landing gear, guides for said landing gear, releasable means for holding said platform and landing gear in adjusted positions, and a single means for selectively adjusting the positions of said landing gear and platform relative to said air vehicle when said releasable means is released.

20. In an air vehicle, the combination with a fuselage, of a supporting means for said fuselage, of a load carried by said fuselage, two separate means for adjusting the position of said load relative to said supporting means for said fuselage, and actuating means for said two separate means.

21. In an air vehicle, the combination with a fuselage, of a supporting means for said fuselage, of a load carried by said fuselage, two separate means for adjusting the position of said load relative to said supporting means for said fuselage, and actuating means for said two separate means, one of said two separate means being also adapted to shift the position of the fuselage relative to said supporting means when actuated by said actuating means.

22. An air vehicle having a load supporting mechanism mounted on the vehicle and reversibly shiftable into predetermined positions, power actuating means for shifting said mechanism, and manually actuated means for also shifting said mechanism relatively to the connection between said power actuating means and said carriage.

In testimony whereof we have signed our names to this specification on this 25 day of May, A. D. 1928.

RICHARD W. SEARS, 2D.
JAMES F. KOCA.